(12) United States Patent
Farwell et al.

(10) Patent No.: US 10,180,193 B2
(45) Date of Patent: Jan. 15, 2019

(54) BUTTERFLY VENT

(71) Applicants: Steven Farwell, Owasso, OK (US);
Geoffrey Brazier, Woodbury, MN (US)

(72) Inventors: Steven Farwell, Owasso, OK (US);
Geoffrey Brazier, Woodbury, MN (US)

(73) Assignee: BS&B Innovations Limited, Limerick (IE)

( * ) Notice: Subject to any disclaimer, the term of this patent is extended or adjusted under 35 U.S.C. 154(b) by 170 days.

(21) Appl. No.: 14/653,127

(22) PCT Filed: Dec. 17, 2013

(86) PCT No.: PCT/US2013/075802
§ 371 (c)(1),
(2) Date: Jun. 17, 2015

(87) PCT Pub. No.: WO2014/100001
PCT Pub. Date: Jun. 26, 2014

(65) Prior Publication Data
US 2015/0337978 A1   Nov. 26, 2015

Related U.S. Application Data

(60) Provisional application No. 61/797,917, filed on Dec. 18, 2012.

(51) Int. Cl.
*F16K 17/02* (2006.01)
*F16K 17/40* (2006.01)
*F16K 17/14* (2006.01)

(52) U.S. Cl.
CPC ............ *F16K 17/406* (2013.01); *F16K 17/14* (2013.01); *Y10T 137/1782* (2015.04)

(58) Field of Classification Search
CPC ......... Y10T 137/1782; Y10T 137/1699; Y10T 137/1744; F16K 17/406; F16K 17/14
(Continued)

(56) References Cited

U.S. PATENT DOCUMENTS 2,747,388 A * 5/1956 Dolar ............... A47J 47/02
217/57
2,905,358 A * 9/1959 Herbage ............ F16K 15/038
137/512.1
(Continued)

FOREIGN PATENT DOCUMENTS

DE         1234117         2/1967

OTHER PUBLICATIONS

International Search Report from the United States Patent and Trademark Office for International Application No. PCT/US2013/075802, dated Jul. 8, 2014.
(Continued)

*Primary Examiner* — Minh Le
(74) *Attorney, Agent, or Firm* — Finnegan, Henderson, Farabow, Garrett & Dunner, LLP

(57) ABSTRACT

A pressure relief device is disclosed. The pressure relief device may take the form of a "butterfly" vent, including paired burst panels or blow-out portions that are configured to open in a manner similar to a butterfly flapping its wings. Upon opening, the paired burst panels may contact each other, thereby absorbing kinetic energy. The burst panels may be positioned within a frame or may be formed or cut from a single sheet. A cord may be provided between the burst panels to retain the burst panels and/or ensure that the burst panels open substantially simultaneously. The pressure relief device also may include an activation mechanism to control the opening of the burst panels, one or more hinge members, and/or a braking member.

16 Claims, 19 Drawing Sheets

(58) Field of Classification Search
USPC ......... 137/68.11, 68.19, 68.25, 68.27, 15.08, 137/521, 520, 527, 527.2, 70; 251/177, 251/304, 305, 173, 286; 411/383, 396; 403/2; 220/89.2, 824, 826, 836, 89.1; 25/1, 98
See application file for complete search history.

(56) References Cited

U.S. PATENT DOCUMENTS

| | | | | |
|---|---|---|---|---|
| 3,026,901 | A * | 3/1962 | Wheeler, Jr. | F16K 1/223 137/454.2 |
| 3,374,804 | A * | 3/1968 | Stegerud | F16K 15/038 137/242 |
| 3,718,156 | A * | 2/1973 | Fujii | F16K 1/223 137/512.1 |
| 3,831,628 | A * | 8/1974 | Kintner | F16K 15/036 137/512.15 |
| 3,877,600 | A * | 4/1975 | Beil | A24F 19/06 131/242 |
| 4,163,496 | A * | 8/1979 | Dogliotti | B65D 47/0847 206/538 |
| 4,196,745 | A * | 4/1980 | Schutzer | F16K 1/223 137/512.1 |
| 4,230,148 | A * | 10/1980 | Ogle, Jr. | F16K 15/038 137/512.1 |
| 4,396,129 | A * | 8/1983 | Itoh | B65D 90/34 137/68.22 |
| 4,694,853 | A * | 9/1987 | Goodwin | F16K 15/038 137/512.1 |
| 4,700,511 | A | 10/1987 | Minialoff et al. | |
| 4,787,180 | A * | 11/1988 | Robinson | B01J 19/002 52/1 |
| 4,896,695 | A * | 1/1990 | Pysh | F16K 15/038 137/512.1 |
| 4,977,926 | A * | 12/1990 | Hocking | A47B 96/068 137/512.1 |
| 5,267,666 | A * | 12/1993 | Hinrichs | F16K 17/162 137/68.21 |
| 5,392,810 | A * | 2/1995 | Cooper | F16K 15/038 137/512.1 |
| 6,012,483 | A * | 1/2000 | Beddies | G01F 1/11 137/512.1 |
| 6,253,788 | B1 | 7/2001 | Pavlogyi | |
| 6,792,964 | B2 * | 9/2004 | Farwell | F16K 17/162 137/68.25 |
| 7,140,380 | B2 * | 11/2006 | Marubayashi | H01M 2/1241 137/68.25 |
| 7,311,740 | B2 * | 12/2007 | Williams | F16K 15/038 137/512.1 |
| 7,325,569 | B2 * | 2/2008 | Denike | B64D 13/02 137/512.1 |
| 7,493,770 | B2 * | 2/2009 | Christianson | F02C 6/08 137/512.1 |
| 7,950,408 | B2 | 5/2011 | Farwell et al. | |
| 2005/0161082 | A1 | 7/2005 | Farwell | |
| 2007/0163648 | A1 | 7/2007 | Eijkelenberg et al. | |
| 2007/0181183 | A1 | 8/2007 | Farwell et al. | |
| 2008/0190951 | A1 * | 8/2008 | Gallagher | B65D 21/0233 220/826 |
| 2009/0256338 | A1 | 10/2009 | Williams | |

OTHER PUBLICATIONS

Written Opinion of the International Searching Authority from the European Patent Office for International Application PCT/US2013/075802, dated Jul. 8, 2014.

First Notification of Office Action, Chinese Application No. 201380073043.6 and Search Report (dated Sep. 28, 2016) (8 pages) and English-language translation (10 pages).

Office Action, Chinese Application No. 201380073043.6 (dated Aug. 14, 2017) (8 pages), with English-language translation (9 pages) (17 pages total).

European Extended Search Report, European Application No. 13864490. 1-1751/2935958 / PCT/US2013075082 (dated Jul. 14, 2016) (8 pages).

* cited by examiner

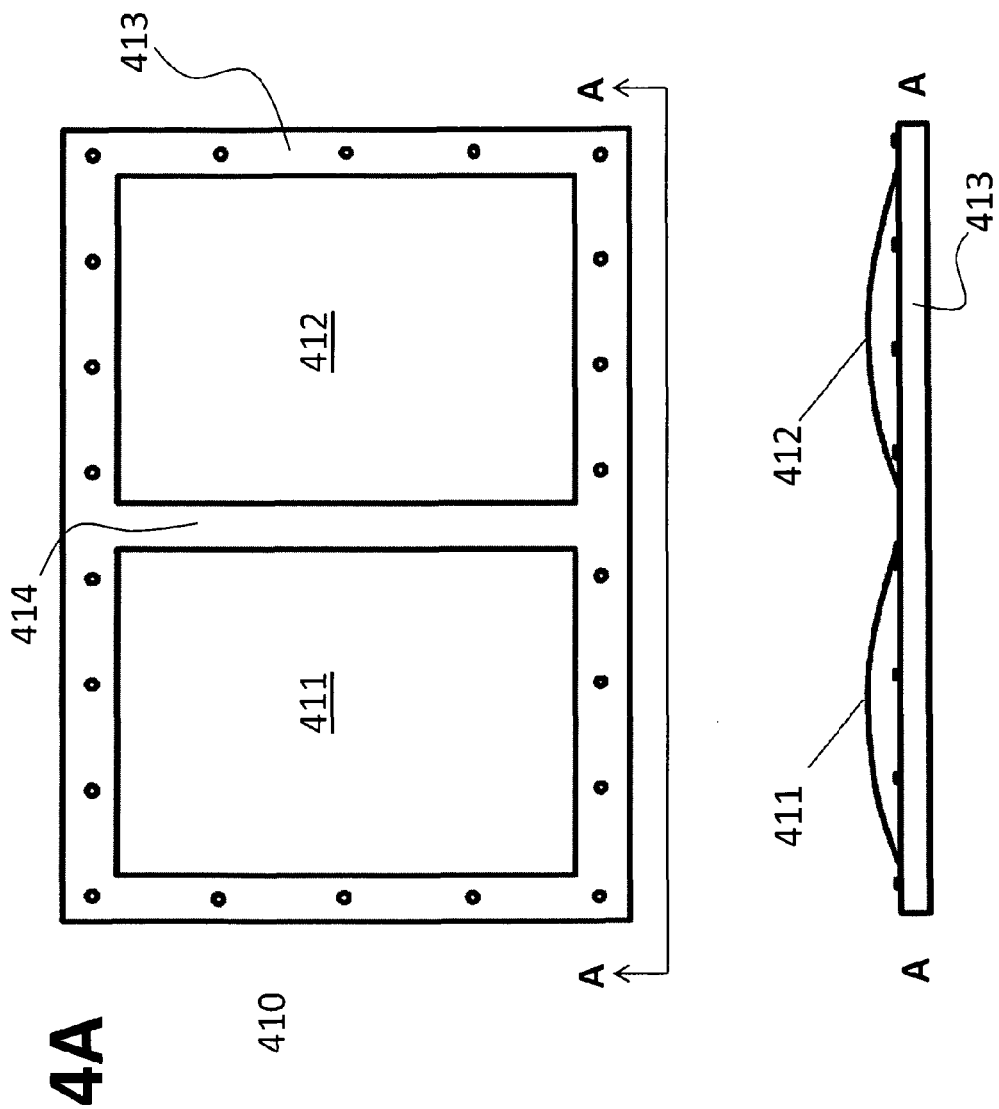

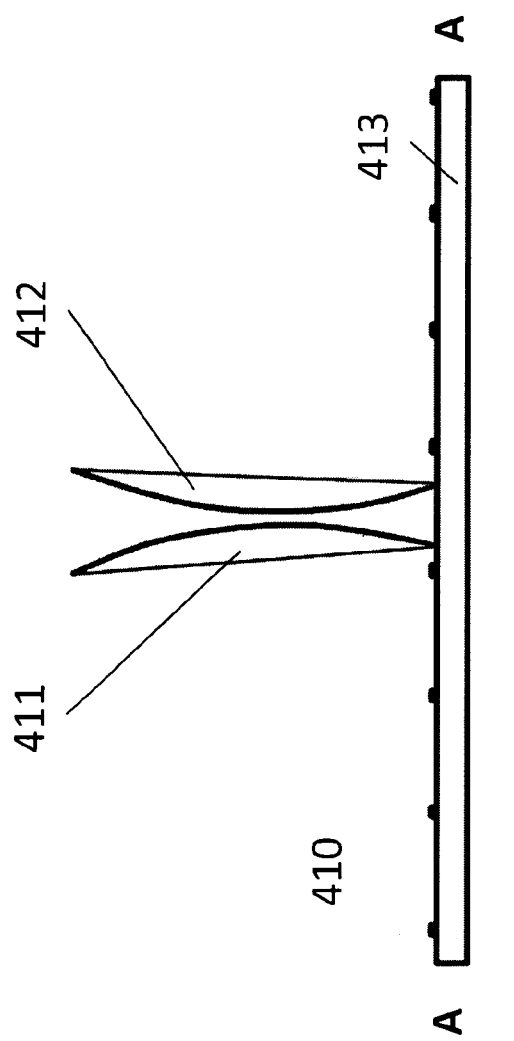

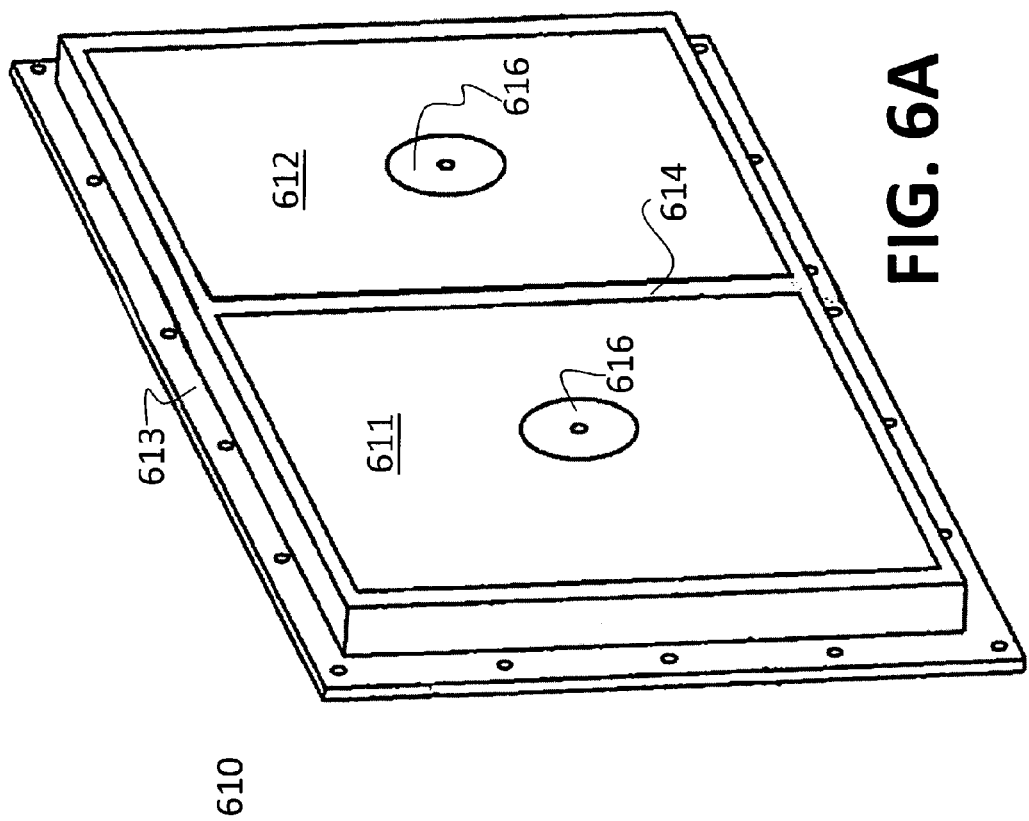

US 10,180,193 B2

BUTTERFLY VENT

PRIORITY CLAIM

This application claims priority to U.S. Provisional Application No. 61/797,917, filed Dec. 18, 2012, the entire contents of which are hereby expressly incorporated by reference.

FIELD OF THE DISCLOSURE

This disclosure is directed to the field of pressure relief vents. More particularly, the disclosure relates to pressure relief vents designed to open during an explosion or in response to a pre-determined pressure differential to reduce damage.

BACKGROUND OF THE DISCLOSURE

Many commercial and industrial processes create the possibility for explosions, even the warehousing of combustible dusts and products that release combustible vapors presents such a risk. Such explosions may damage or destroy any structure that is not designed to resist the considerable pressures generated by a dust or vapor explosion. Deflagration vents, blow out panels, explosion panels, or explosion vents have been employed to lessen any damage to a structure housing potentially dangerous processes when an explosive event occurs by allowing the pressure created in such an explosion to escape through deflagration vents to mitigate and even prevent the deformation and/or destruction of the structure. A pressure relief device is a broad term encompassing at least all the venting devices described above. The above described venting practices are particularly effective in the case of explosions that propagate below the speed of sound, a deflagration. Industry standards such as NFPA 68 in the United States and the ATEX directive, used in Europe, and related harmonized standards in Europe and elsewhere establish requirements for such protective measures.

Because a temperature, climate, and/or clean controlled environment is desired, and even required by some processes, deflagration vents have been employed that maintain the environmental integrity of the structure. Such vents in the past have been held in place by magnets, spring mechanisms, re-settable latches, or have been constructed of frangible materials. One type of vent involves a burst panel, such as disclosed in co-owned U.S. Pat. No. 7,950,408 ("the '408 patent"), the entire contents of which are incorporated herein by reference. A burst panel may include a release mechanism configured to hold a panel member against a frame, or may be sealed against a frame in some other fashion.

In an explosion or other event causing a vent to open, it may be desirable to prevent the opened portion of the vent (e.g., the panel in a burst panel vent) from becoming a projectile or otherwise falling and causing damage to persons or property. As disclosed in the '408 patent, the opened portion of the vent may be attached to the structure, or to a vent frame installed in the structure, by a shock cord or cable. Alternatively in the '408 patent, the opened portion of the vent may be attached to the structure or vent frame by way of a hinge or other attachment mechanism.

In the known applications of vents, including burst panel vents, retaining an opened portion of the vent attached to the structure or vent frame may transfer relatively high forces to the structure as the opened portion of the vent opens. For example, a known burst panel vent is typically used with a high-strength enclosure that can survive a "reduced explosion pressure" ($P_{red}$)—i.e., the maximum pressure developed in a vented enclosure during a vented deflagration—of 1½ pounds per square inch gage (psig) or more. Such enclosures typically are constructed from reinforced concrete, bolted or welded steel fabrications, and fiber reinforced fabrications or a combination of materials to achieve the necessary operating strength. Even though the activation pressure ($P_{stat}$) of a vent used in such an enclosure may be lower than 1½ psig—typically ⅓ psig or less for large volume building structures—the pressure generated by a deflagration will continue to increase after the vent has opened due to the dynamic nature of a deflagration and/or combustion event; therefore, the strength of the enclosure elements that retain the vent must be sufficiently strong to survive an explosion using a known explosion vent. The force that must be carried by the enclosure at the vent location can be determined from the value of $P_{red}$ and the vent area. For example, a vent might have a nominal size of 36-inches×36-inches, presenting a vent area of 1296 square inches. At a set pressure of ⅓ psig this could impart a load of 432 pounds on the vent-retaining element of the enclosure. However, the enclosure and/or vent-retaining element may be required to survive a $P_{red}$ of 1½ psig—which could impart a force of 1944 pounds. In other applications, a $P_{red}$ of 3 psig would impart a force of 3888 pounds. These are forces that can lead to failure of enclosure vent mounting arrangements. In a worst case scenario, a vent-mounting frame arrangement could be torn out of the enclosure under such high forces, presenting a secondary mechanical hazard.

It is desirable to enable safe venting of lower strength enclosures, such as sheet metal or simple masonry, which may not survive the $P_{red}$ of the vent application. It also is desirable to enable venting where the mounting arrangement of a vent (e.g., the frame, bolts, and/or other mechanism(s) by which a vent is installed in a structure or enclosure) cannot otherwise cope with the momentary forces generated when a known vent activates in response to a deflagration. The forces generated on a mounting arrangement are a function of vent area and $P_{red}$. Thus, with large vent areas occupying several square feet, the combined loading of even a fraction of a psi of pressure can be considerable. Accordingly, it is desirable to provide a vent that will reduce the forces imparted on a mounting arrangement and/or enclosure when a large vent area opens in response to a deflagration. The present disclosure provides one or more of these, and/or other, advantages.

SUMMARY

In one embodiment, a pressure relief device comprises a first vent comprising a first panel, a second vent comprising a second panel, and a connecting member interposed between the first panel and second panel. The first panel and second panel are configured to rotate relative to the connecting member. The first panel is configured to open upon activation of the first vent, and the second panel is configured to open upon activation of the second vent. The first panel and second panel are configured to engage at least their outer ends upon opening.

In another embodiment, a pressure relief device comprises a frame having a central portion. A first burst panel is mounted within the frame, wherein the first burst panel is configured to rotate relative to the central portion upon opening. A second burst panel is mounted within the frame, wherein the second burst panel is configured to rotate relative to the central portion upon opening. The first burst panel and second burst panel are configured to activate and open upon experiencing a predetermined pressure differential. And at least a portion of the first burst panel engages with at least a portion of the second burst panel upon activation.

In still another embodiment, a pressure relief device comprises a sheet. The sheet includes a first line of weakness defining a first burst panel, a second line of weakness defining a second burst panel, and a central portion between the first burst panel and the second burst panel. The first burst panel is configured to activate and rotate relative to the central portion upon experiencing a predetermined pressure differential, wherein rotation of the first burst panel creates a first opening in the sheet. The second burst panel is configured to activate and rotate relative to the central portion upon experiencing a predetermined pressure differential, wherein rotation of the second burst panel creates a second opening in the sheet. And at least a portion of the first burst panel is configured to contact at least a portion of the second burst panel upon activation of the first burst panel and second burst panel.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

FIGS. 4A-4C illustrate different views of an embodiment of a butterfly vent including domed blow-out panels.

FIGS. 6A-6E illustrate different views of an embodiment of a butterfly vent with a release mechanism and a cord connecting two burst panels.

DESCRIPTION OF THE EMBODIMENTS

Reference will now be made in detail to the present exemplary embodiments of the disclosure, examples of which are illustrated in the accompanying drawings. Wherever possible, the same reference numbers will be used throughout the drawings to refer to the same or like parts.

For the purposes of this disclosure, an explosive event may include any event causing the pressure relief vent to open. Such events may include a dust or gas explosion, any event that causes pressure to build rapidly inside of a structure, a weather event causing a sufficient pressure differential, a physical blow to the vent causing it to open, an HVAC error causing a sufficient pressure differential, other accidental openings, etc.

Figure 1A:
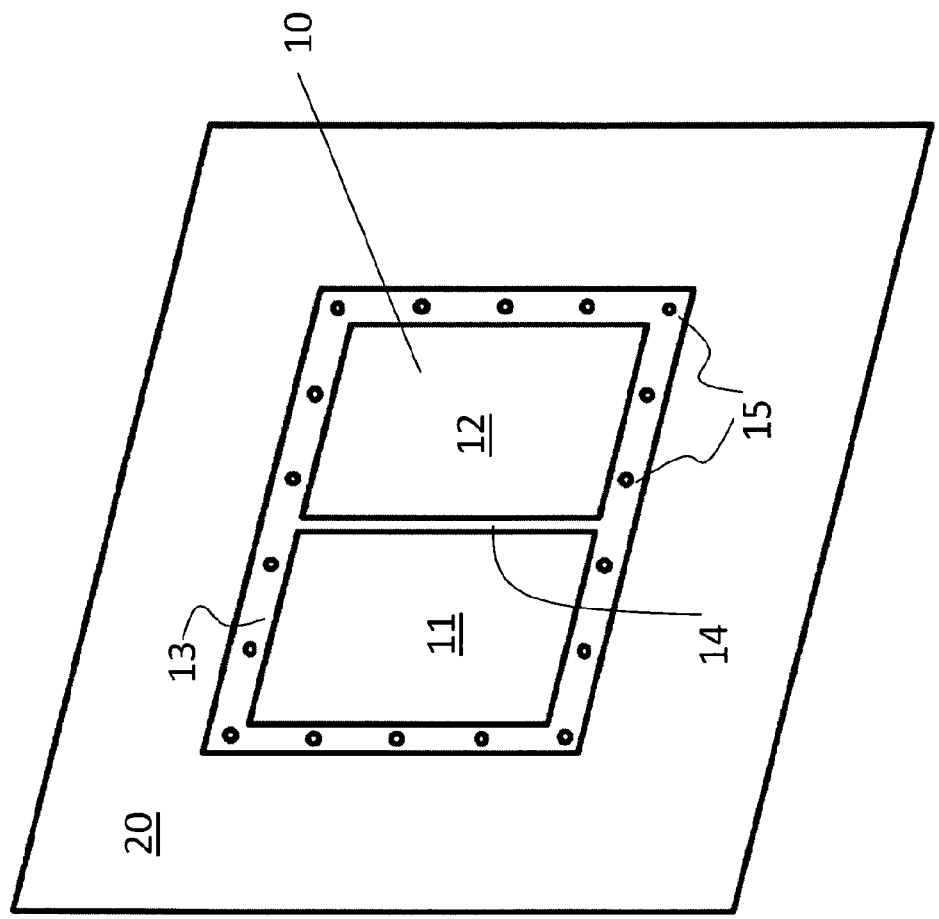
FIG. 1A is a view of a pressure relief device in the form of a butterfly vent, according to one embodiment of the present disclosure.

FIG. 1A illustrates an exemplary butterfly vent consistent with the present disclosure. The butterfly vent may comprise, for example, a vent 10. The vent 10 may include a pair of blow-out portions 11 and 12 held into a frame 13. The frame 13 may be installed in a structure or other enclosure 20. In FIG. 1A, the frame 13 is installed in the structure or enclosure 20 by a series of bolts 15.

As illustrated in FIG. 1A, a connecting member 14 may extend between the pair of blow-out portions 11 and 12. The blow-out portions 11 and 12 may be configured to open or "blow out" in response to an increased pressure within the structure or enclosure. In the embodiment of FIG. 1A, the blow-out portions 11 and 12 are arranged in a "butterfly vent" configuration, such that they are configured to open in a manner similar to a butterfly flapping its wings. More specifically, the blow-out portions of FIG. 1A are configured to rotate around the connecting member 14 and clap together upon opening, as illustrated in FIG. 1B.

Figure 1B:
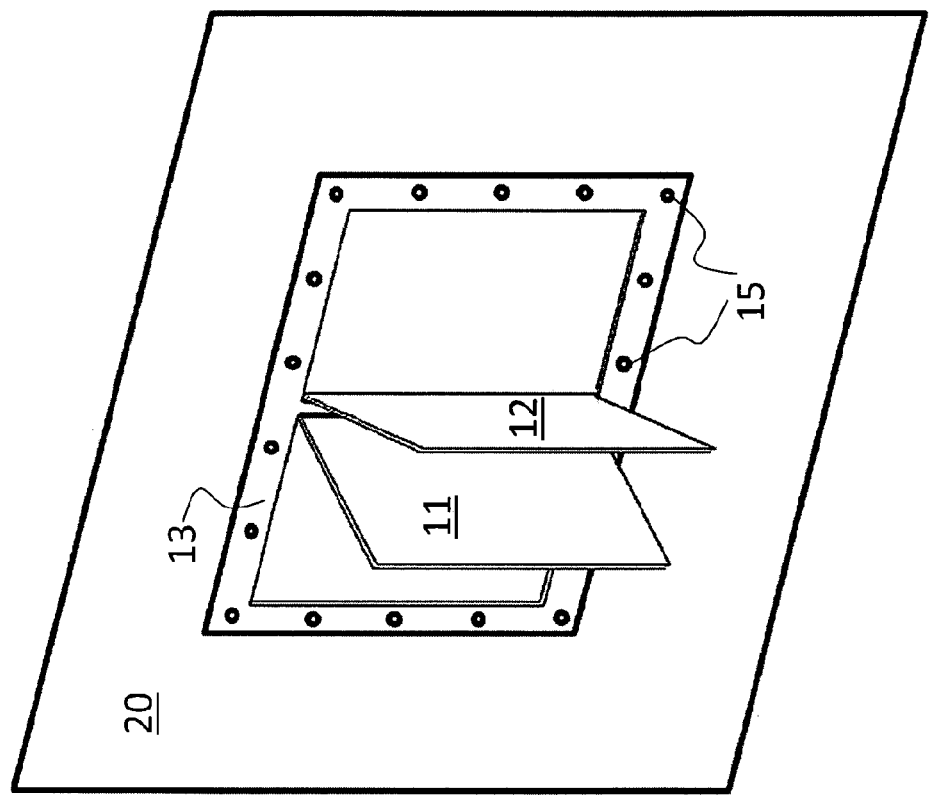
FIG. 1B illustrates the butterfly vent of FIG. 1A after activation or opening.

FIG. 1B illustrates the butterfly vent of FIG. 1A in an open condition. As shown in FIG. 1B, the paired blow-out portions 11 and 12 swing outward and clap together upon opening. The impact between the paired blow-out portions 11 and 12 absorbs kinetic energy (which may be dissipated, e.g., in the form of sound, heat, deformation, vibration of the blow-out portions 11 and 12). In one embodiment, the paired blow-out portions 11 and 12 may be configured to join together upon impact. Newton's Third Law of Physics teaches that every action has an equal and opposite reaction. Thus, when the two blow-out portions collide—each having the same nominal size and mass and being driven by the same force—the energy is cancelled without imparting stress into the supporting vent frame and enclosure structure. As a result, less kinetic energy remains to be absorbed by the frame 13 and, by extension, the structure or enclosure 20. In this manner, the butterfly vent provides advantages over known vents, including known burst panel vents. The frame 13, or the structure/enclosure 20 in which the frame is installed, may be made of a weaker material (or using less material) than if a butterfly vent is not used, thereby saving cost and complexity of manufacture. Because the butterfly vent of the present disclosure reduces kinetic loads on a structure or enclosure, the butterfly vent may be used with relatively weak structures (e.g., sheet metal structures) on which known burst panels and other vents may not be suitable. In addition, the number and size of bolts or other attachment mechanisms used to install a frame within a structure/enclosure also may be reduced when a butterfly vent is used.

In the embodiment of FIGS. 1A and 1B, connecting member 14 is illustrated as a component separate from blow-out panels 11 and 12. For example, connecting member 14 may be a portion of the frame 13, or may be a component attached to the frame 13.

Figure 2:
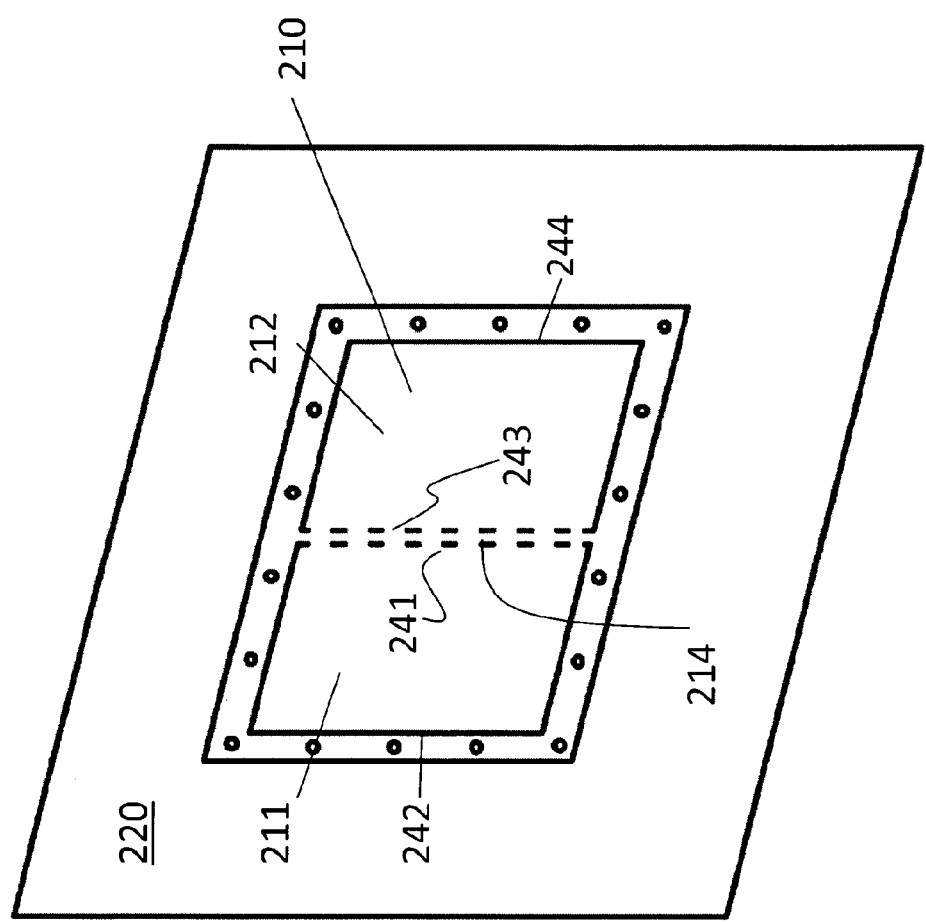
FIG. 2 illustrates an embodiment of a pressure relief device in the form of a butterfly vent, which a connecting member formed integrally with two partially cut-out blow-out panels.

In another embodiment, illustrated in FIG. 2, connecting member 214 may be integrally formed with one or more of burst panels 211 and 212. For example, connecting member 214 and burst panels 211 and 212 may be formed from a single sheet of material. As illustrated in FIG. 2, burst panel 211 is partially defined by a line of weakness 242, which may be (for example) a cut, etched, or stamped perimeter, and which extends around three sides of a rectangular burst panel profile. A fourth side of the rectangular burst panel profile, indicated by dotted line 241, may be a line of bending. Similarly in FIG. 2, burst panel 212 is partially defined by a line of weakness 244, which may be (for example) a cut, etched, or stamped perimeter, and which extends around three sides of a rectangular burst panel profile. A fourth side of the rectangular burst panel profile, indicated by dotted line 243, may be a line of bending. The lines of bending 241 and 243 may be defined by a line of weakness created by, e.g., a cut, partial cut, etch, stamp, or perforation in the sheet of material. Alternatively, the line of bending 241, 243 may be uncut or unweakened. In one embodiment, a hinge element may be provided along a line of bending to facilitate bending and/or retention of a burst panel upon bursting.

A connecting member 214 is formed between the lines of bending 241 and 243. In response to an explosive event within enclosure 220, burst panels 211 and 212 may tear open along cut or etched perimeters 242 and 244, bending toward each other along lines of bending 241 and 243 (similarly to FIG. 1B). In one embodiment, connecting member 214 may be reinforced.

As illustrated in FIG. 2, the butterfly vent is applied directly to the enclosure 220 without the use of a separate "frame." It is contemplated that a butterfly vent may be installed with an enclosure using, e.g., stud bolts, welding, clamps, adhesives, or other attachment mechanisms without an outlet frame.

Figure 3B:
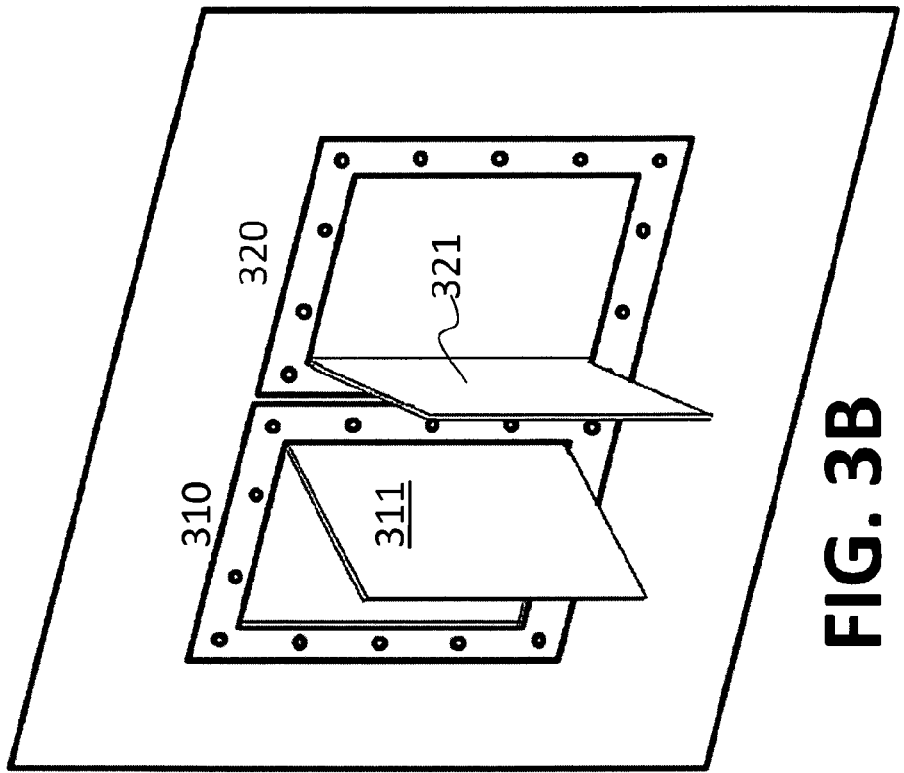
FIGS. 3A-3B illustrate an embodiment of the disclosure including two side-by-side vents arranged to open in a butterfly vent configuration.
Figure 3A:
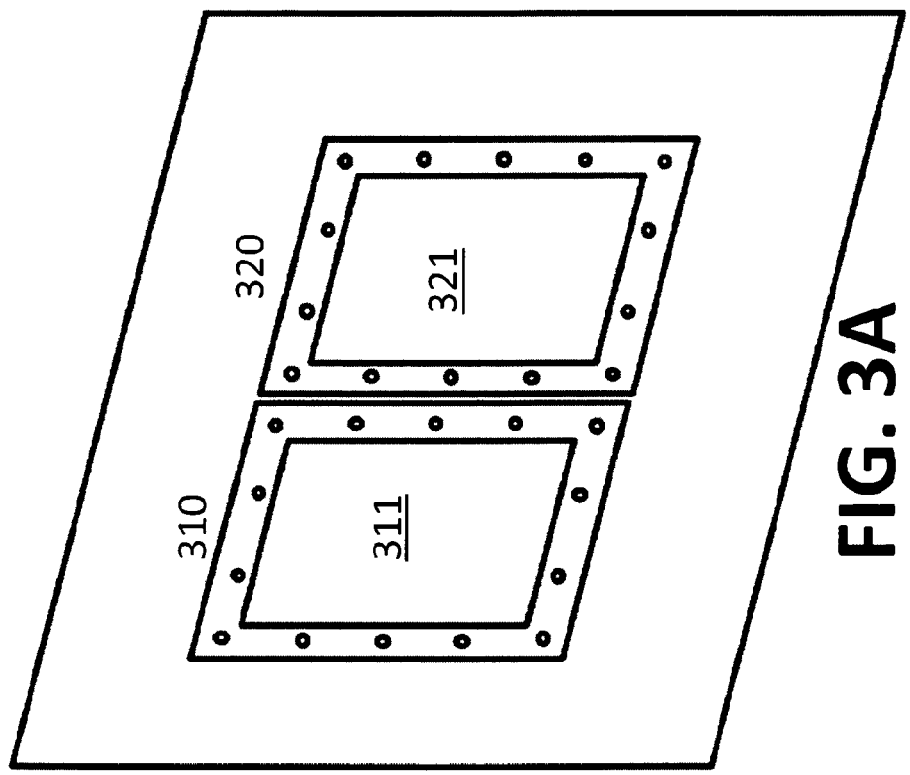

FIGS. 3A-3B illustrate an embodiment including two separate vents 310 and 320 installed adjacent to one another. The vents may be arranged to open in a butterfly vent configuration according to the present disclosure, so that panels 311 and 321 rotate toward each other when opened, as illustrated in FIG. 3B.

FIGS. 4A-4C illustrate another embodiment of a butterfly vent 410. As illustrated in FIG. 4A, a connecting member 414 may extend between a pair of blow-out portions 411 and 412 arranged in a "butterfly vent" configuration. More specifically, the blow-out portions of FIG. 4A are configured to rotate around the connecting member 414 upon opening, as illustrated in FIG. 4C. As best illustrated in FIG. 4B, which is a view of the vent along line A-A as designated in FIG. 4A, the blow-out portions 411 and 412 may be provided with a domed or bulged configuration. In this manner, when the blow-out portions 411 and 412 clap together upon opening (i.e., as shown in FIG. 4C), the blow-out portions 411 and 412 may crumple or otherwise deform, thereby absorbing kinetic energy from the vent's opening. When blow-out portions 411 and 412 "clap together," at least a portion of blow-out portion 411 contacts at least a portion of blow-out portion 412. In one embodiment, an outer edge of blow-out portion 411 contacts an outer edge of blow-out portion 412. By clapping together, the butterfly vent 410 may further reduce the amount of force transferred to the frame 413 or enclosure (not shown in FIGS. 4A-4C).

Figure 5A:
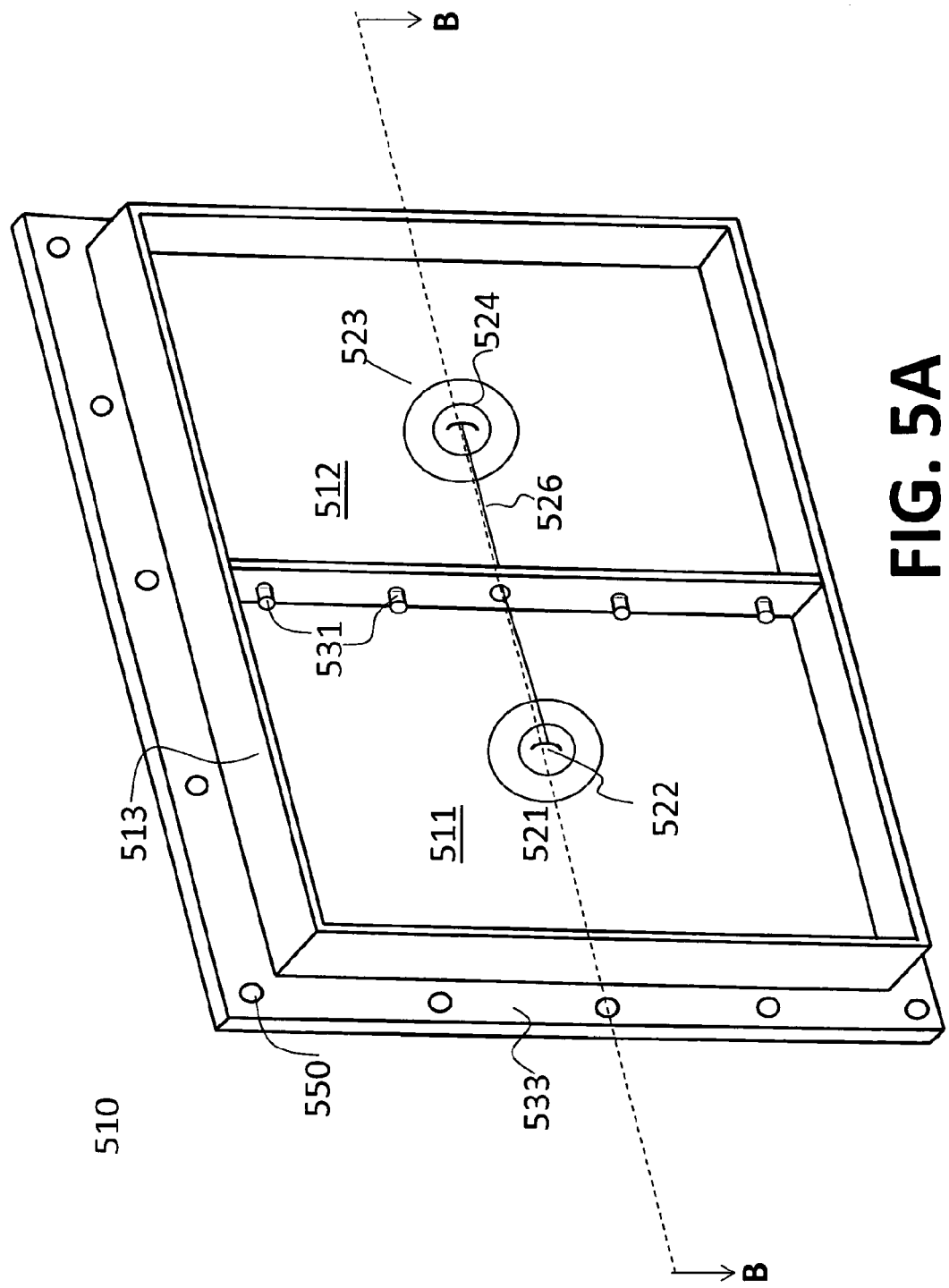
FIGS. 5A-5B illustrate different views of an embodiment of a butterfly vent with a cord connecting two burst panels.
Figure 5B:
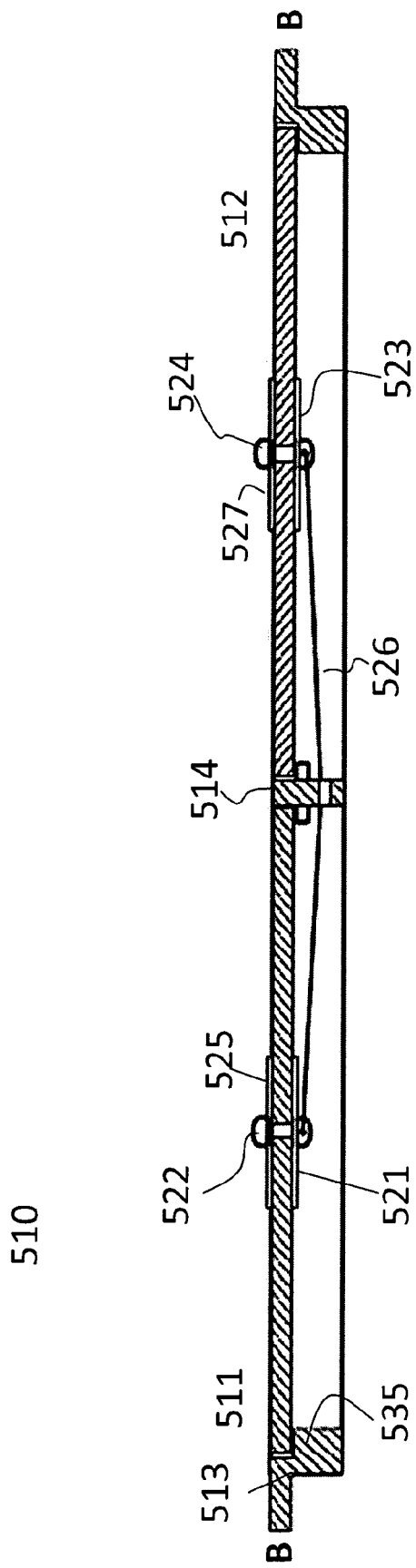

FIGS. 5A and 5B illustrate another embodiment of a butterfly vent 510. A butterfly vent may include a frame 513, in which two burst panels 511 and 512 are sealed. Burst panels 511 and 512 may be sealed to the frame 513, adjacent to each other, on opposite sides of connecting member 514. The frame 513 may be arranged such that an outer flange 533 is created around the periphery of the vent 510 allowing installation into a conventional window opening in a building or other commercial or residential structure or other enclosure. The outer flange 533 may include one or more bolt holes 550 (FIG. 5A). As illustrated in FIG. 5B, the burst panels 511 and 512 may be secured to the frame via their central hubs (comprising bolts 522, 524, and washers 521, 523, 525, and 527, as described below). Additionally or alternatively, the frame 513 may be provided with one or more dowels 531 or other components to house or secure burst panels 511 and 512 within the frame 513.

As illustrated in FIGS. 5A and 5B, a cord 526 connects burst panels 511 and 512 to each other. As illustrated in FIGS. 5A and 5B, cord 526 is attached at either end to bolt 522 in burst panel 511 and bolt 524 in burst panel 512. The cord 526 may be installed in tension between bolts 522 and 524, which may contribute to the sealing of burst panels 511 and 512 to the frame 513. An inlet-side washer (521, 523) and outlet-side washer (525, 527) may be used to distribute forces imparted by the bolts (522, 524) on the burst panels (511, 512). In one embodiment, the cord 526 may pass through a hole or eyelet provided within or attached to connecting member 514.

The burst panels 511 and 512 are configured to open upon experiencing a predetermined pressure differential, resulting in separation of panels 511 and 512 from frame 513, thereby safely venting the pressure differential through the openings left within the frame 513. The cord 526 retains the burst panels 511 and 512 to the frame 513 upon opening. The cord 526 also ensures that the burst panels 511 and 512 open in a butterfly vent fashion—i.e., burst panels 511 and 512 rotate around connecting member 514 and clap together.

In one embodiment, cord 526 tunes the timing of opening of the burst panels—i.e., cord 526 ensures that burst panels 511 and 512 open in a coordinated manner. Due to the age of a seal, manufacturing tolerances, improper installation, etc., one burst panel 511 may open prior to the other burst panel 512 in response to a pressure differential. It may be preferred, however, that both burst panels 511 and 512 open approximately simultaneously. Simultaneous opening of burst panels 511 and 512 may maximize the vent area open at the onset of an explosive event (which may increase safety and efficiency) and also may ensure that the energy-absorbing benefits of a butterfly vent configuration (i.e., when the paired burst panels 511 and 512 clap against each other) are achieved. In the illustrated embodiment, when burst panel 511 opens, it pulls on burst panel 512 via cord 526. That tension—directed perpendicularly to the direction of burst panel release—may free burst panel 512 from its seal (or other retention device), allowing burst panel 512 to open approximately simultaneously with burst panel 511.

Figure 6B:
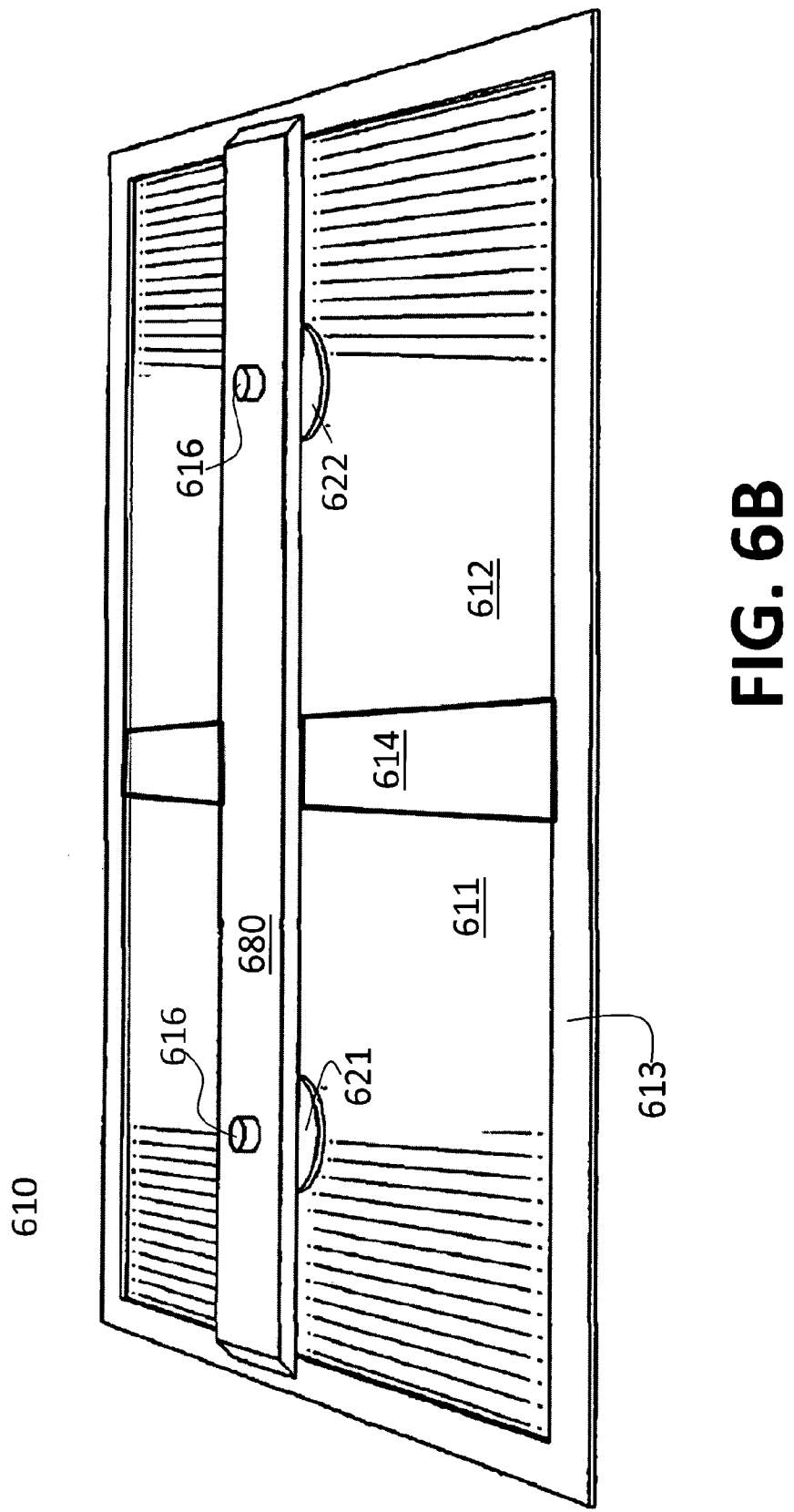

In another embodiment, as illustrated in FIGS. 6A-6E, a butterfly vent may be provided with a release mechanism, such as are disclosed in the '408 patent. As illustrated in FIG. 6A, a butterfly vent 610 may include a first panel member 611 and a second panel member 612, such as a polycarbonate window, held into a frame 613, such as an aluminum frame, with a release mechanism 616. A connecting member 614 may be positioned between the two panel members.

FIG. 6B depicts a perspective view of an inlet side of vent 610, which is illustrated as being located within a frame 613. As seen in FIG. 6B, the panel members 611 and 612 are installed such that they are positioned on the outlet side (i.e., facing away from the enclosure) relative to the frame 613.

The frame 613 may also have one or more cross members 680 (FIG. 6B) to provide stability and anchor points for release mechanisms 616. The release mechanisms may be, for example, a release mechanism as described in the '408 patent. In one embodiment, the release mechanisms 616 may be a release mechanism as illustrated in FIG. 4 of the '408 patent. When a predetermined pressure differential exists between the inlet side and the outlet side of the panel members 611 and 612 (e.g., when an explosive event occurs within the enclosure), the panel members 611 and 612 are forced away from the frame 613, toward the outlet direction. The force load applied to the panel members 611 and 612 transfer a force to the release mechanisms 616, resulting in separation of the panel members 611 and 612 from frame 613 and the cross member 680, thereby safely venting the pressure differential through the opening left within the frame 613.

As seen in FIG. 6B, the cross member 680 may provide a convenient location for mounting the release mechanisms 616. A washer member 621, 622 may contact the inlet side of the panel members 611 and 612 and be located on the release mechanism 616 between the panel members 611 and 612 and cross member 680. In addition, the cross member 680 may provide enhanced resistance to accidental physical contact along the inlet side of panel members 611 and 612, resistance to vacuum pressures, or resistance to strong wind loading on the panel members 611 and 612.

Figure 6C:
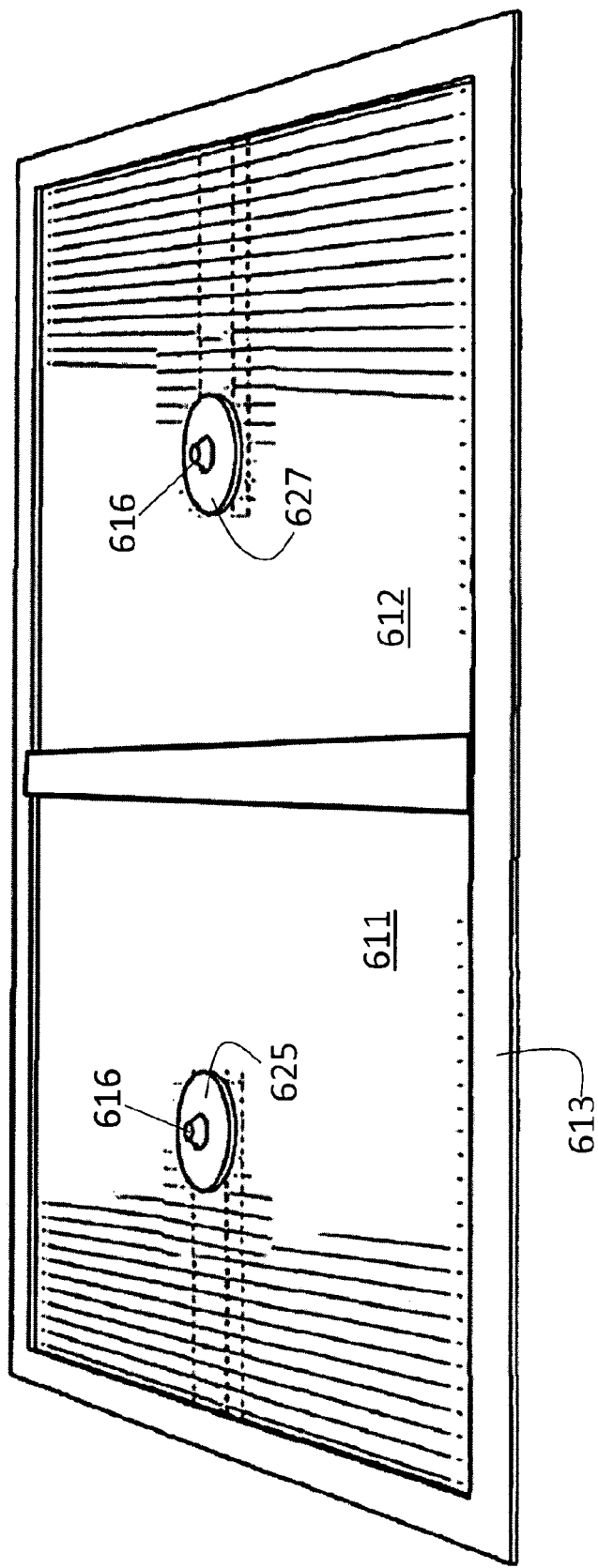

FIG. 6C depicts a perspective view of an outlet side of vent 610, which is illustrated as being located within a frame 613. As seen in FIG. 6B, in one embodiment, washer members 625, 627 are located on the outlet side of the panel members 611 and 612 and receive the release mechanisms 616. The washer members 625, 627 serve to distribute force over a larger area of panel members 611 and 612 upon occurrence of a predetermined pressure differential. For example, the washer members 625, 627 may be configured to distribute the load of an explosive event across sufficient surface area of the panel member to minimize the possibility of the panel breaking around or pulling off the release mechanisms 616.

Figure 6D:
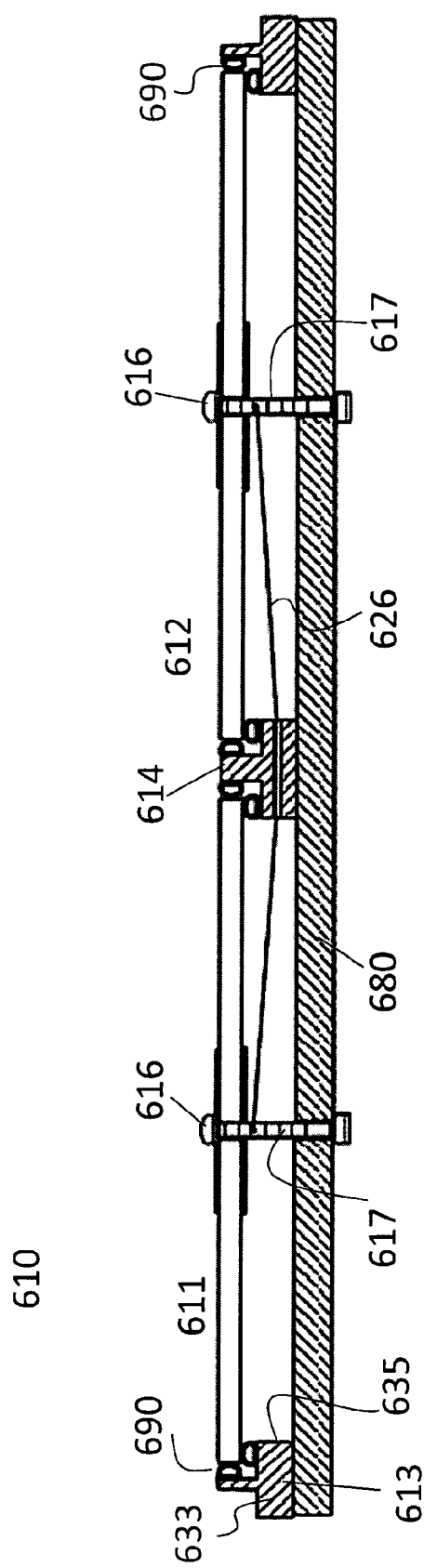

FIG. 6D illustrates a cross-sectional view of the vent system 610 taken through a cross-member 680 of the vent system 610 when the vent system 610 is in an installed, pre-venting configuration. As seen in FIG. 6D, the panel members 611 and 612 may be sealed against the aluminum frame 613 with gaskets or weather stripping 690. The gasket or weather stripping 690 allows the vent system 610 to be weather-tight. The gasket or weather stripping 690 may also allow for expansion of the panel members 611 and 612 as a result of heat, while still allowing sufficient clearance for the panel members 611 and 612 to release from the frame 613 if an explosive event occurs.

As seen in FIG. 6D, the panel members 611 and 612 may be held against the frame 613 with release mechanisms 616. The release mechanisms 616 may pass through apertures in the panel members, as well as through apertures through the cross member 680 to hold the panel members tight against the frame 613.

As FIG. 6D illustrates, frame 613 may be made of "T" stock, e.g., aluminum "T" stock. The "T" stock may be arranged such that an outer flange 533 is created around the periphery of the vent 610 allowing installation into a conventional window opening in a building or other commercial or residential structure or other enclosure. The outer flange 633 may include one or more bolt holes (not shown). The "T" stock arrangement may also provide an inner flange 635 on the inside of the frame 613 to house the burst panels 611 and 612.

Figure 6E:
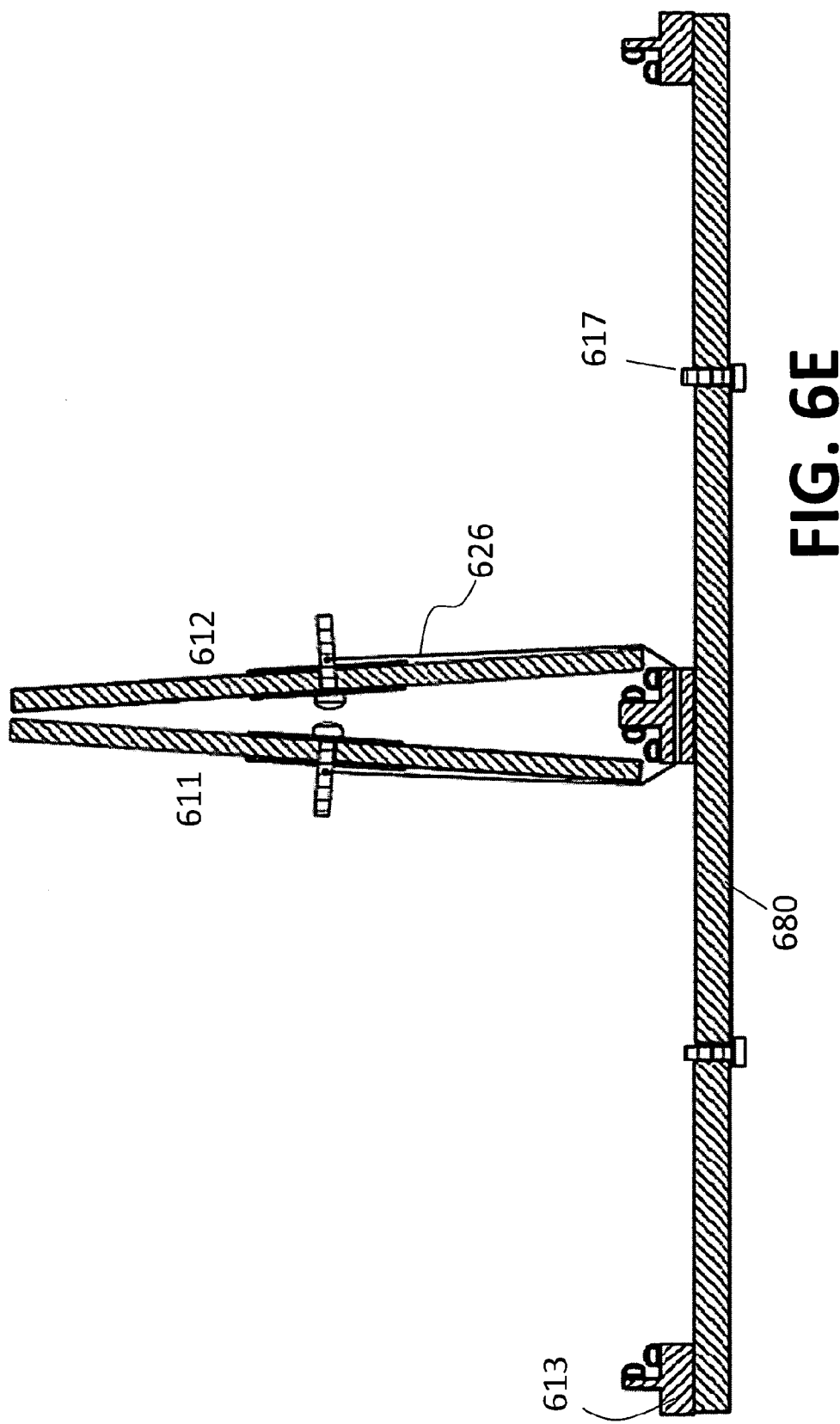

In the exemplary embodiment depicted in FIGS. 6A-6E, the release mechanisms 616 include a failure member 617 comprised of an element configured to break upon the application of a predetermined force. Accordingly, when a predetermined pressure differential occurs, the panel members 611 and 612 exert a predetermined force on the failure members 617 resulting in a break along the failure members 617 and allowing separation of the panel members 611 and 612 from frame 613 and the cross member 680 (as illustrated in FIG. 6E), thereby safely venting the pressure differential through the opening left within the frame 613. The failure member may be a failure member such as is disclosed in the '408 patent.

As shown in FIGS. 6D-6E, the panel members 611 and 612 may be further attached to each other by a cord 626 or cable. In one embodiment, the cord 626 may also be attached to the frame 613 to prevent the panel members 611, 612 from becoming projectiles or otherwise falling and causing damage to persons or property. The cord 626 or cable also ensures that the burst panels 611 and 612 open in a butterfly vent fashion—i.e., burst panels 611 and 612 rotate around connecting member 614 and clap together. In one embodiment, cord 626 also ensures that burst panels 611 and 612 open in a coordinated manner.

The cord 626 or cable may be attached to the panel members 611, 612 through the release mechanisms 616 or to other points on the panel members. The cord 626 or cable may be attached to the cross member 680 (or another location on the structure of frame 613). In one embodiment, a braking member may be used with the cord. Where the cord 626 or cable is constructed of a material having elastic properties, some of the force from the panel members 611 and 612 leaving the frame 613 may be absorbed without the cord 626 breaking, snapping, fraying, or otherwise failing.

Figure 12:
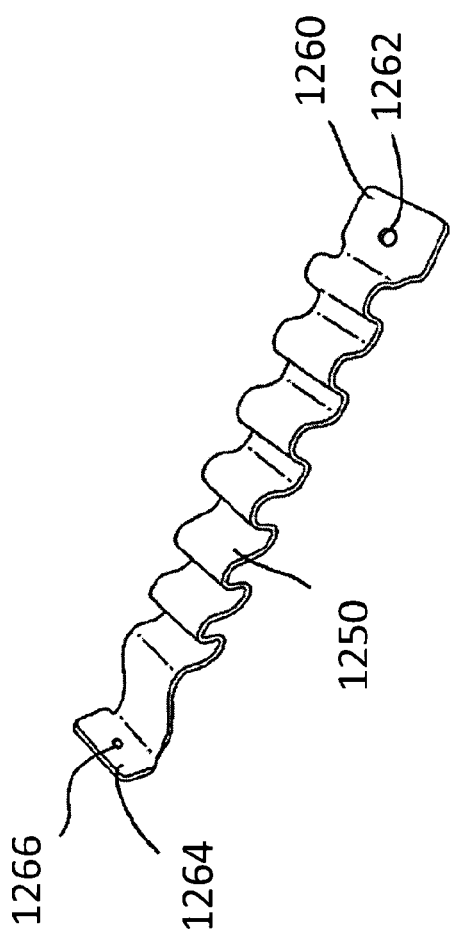
FIG. 12 illustrates an embodiment of a braking member that may be used with a butterfly vent.

An exemplary braking member 1250 is illustrated in FIG. 12. The braking member 1250 may be configured such that it bends as a cord (e.g., 626) pulls against it. In this manner, the braking member 1250 can absorb some of the kinetic energy force upon the opening of a panel. In one embodiment, the braking member 1250 may comprise a material with relatively high elongation properties and may elongate to absorb kinetic energy. In addition, or as an alternative, the shape of the braking member may be modified to facilitate the absorption of kinetic energy. For example, as illustrated in FIG. 12, a braking member may have a first end 1260 with an aperture 1262 to facilitate connection of the braking member 1250 to a frame or other structure. The braking member may have a second end 1264 with an aperture 1266 to facilitate connection to a cord (e.g., 626). The braking member 1250 may exhibit a wavy shape (e.g., a sinusoidal shape), such that as the braking member is pulled tight by a cord after the release of a panel, the pattern of waves transition to a relatively more straightened pattern as kinetic energy is absorbed.

Figure 7:
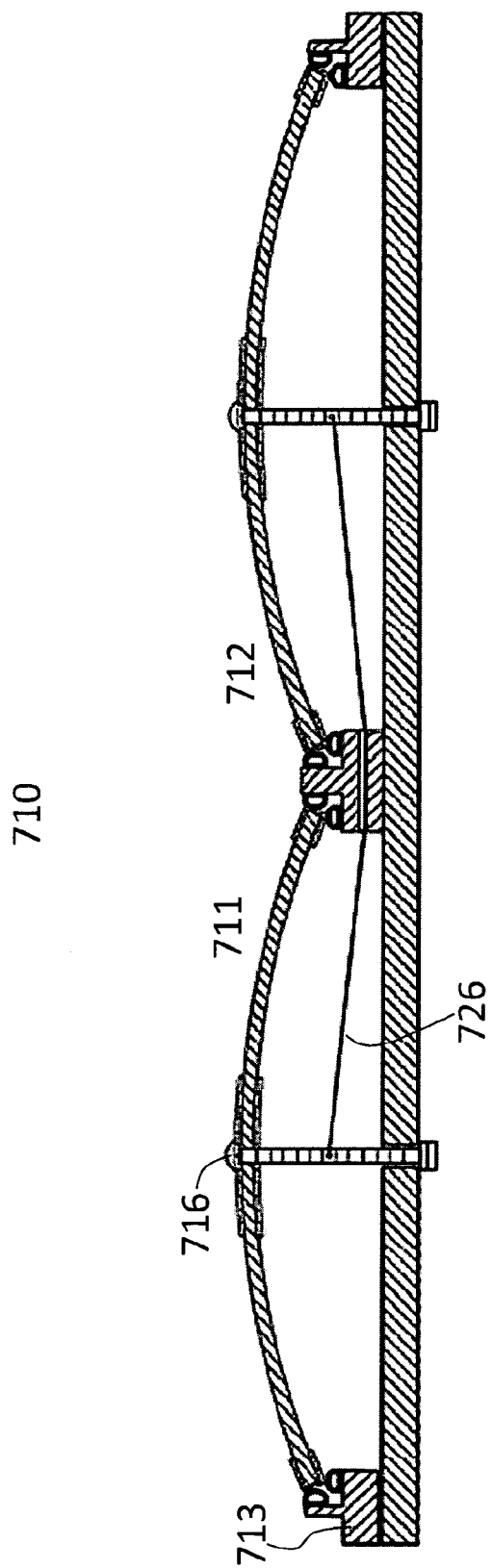
FIG. 7 illustrates a cross-sectional view of an embodiment of a butterfly vent with a release mechanism and domed burst panels.

FIG. 7 is a cross-sectional view of another embodiment of a butterfly vent. As seen in FIG. 7, the panel members 711, 712 may be domed or bulged. The panel members 711 and 712 may be held against a frame 713 by way of release mechanisms 716. When a predetermined pressure differential is reached, the release mechanisms 716 may release the panel members 711, 712. A cord 726 ensures that the panel members 711, 712 open in a butterfly vent fashion. That is, the panel members will rotate around a connecting member 714 and clap together. The panel members 711, 712 may deform upon contacting each other, thereby absorbing kinetic energy.

Figure 9:
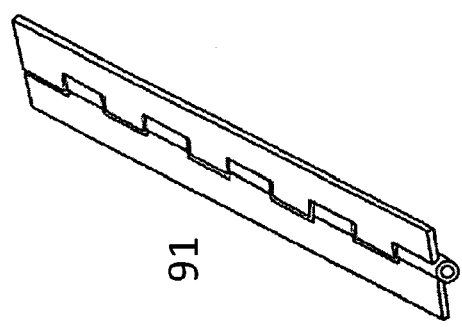
FIG. 9 illustrates another embodiment of a hinge that may be used with a butterfly vent.
Figure 8:
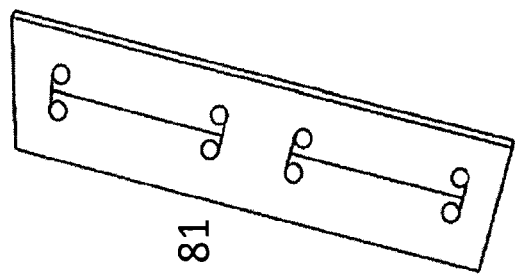
FIG. 8 illustrates a hinge that may be used with a butterfly vent.
Figure 10:
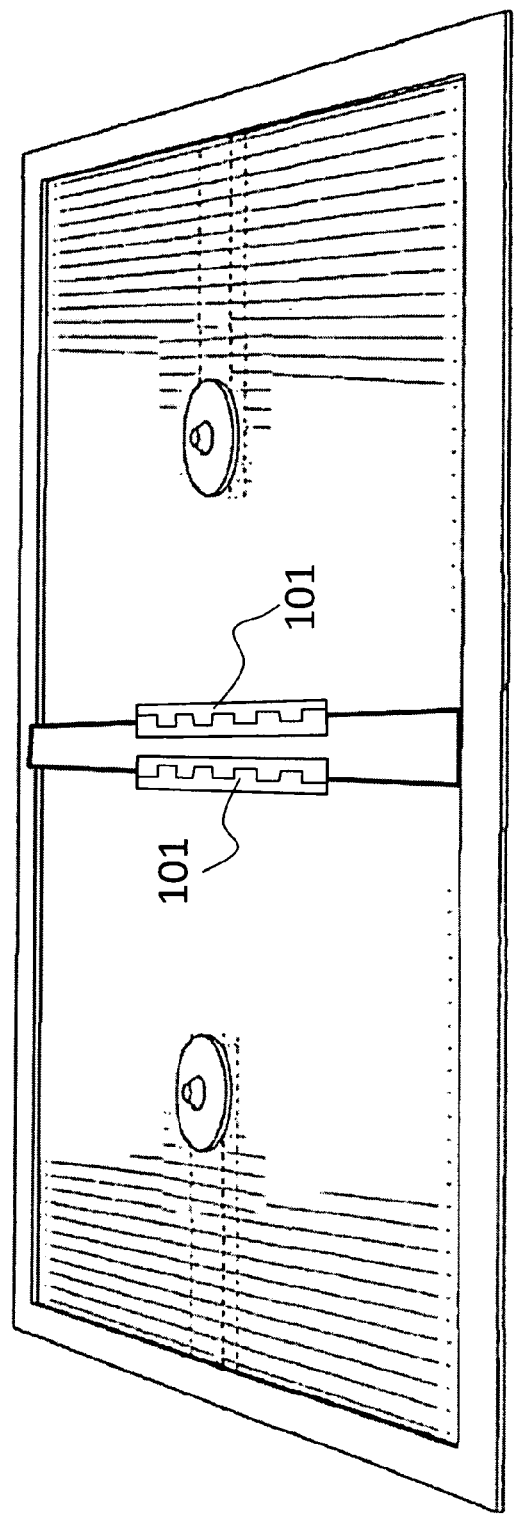
FIG. 10 illustrates a butterfly vent configured with a pair of hinges.

FIGS. 8-10 depict various hinges 81, 91, 101 that may be used with a butterfly vent. A hinge 81, 91, 101 may be used to ensure that paired vents open in a butterfly vent configuration (see, e.g., FIG. 10), with their flaps rotating toward each other around a central connecting member. A hinge also may be used to absorb further kinetic energy upon activation of a butterfly vent system. Exemplary hinges are disclosed in the '408 patent. A hinge may be provided with a stress distribution feature, such as are described in commonly-owned U.S. Pat. No. 6,792,964 B2, the entire contents of which are hereby incorporated by reference. Alternatively, a hinge may be provided by integrally connecting the panel member to one side of the frame, similar to explosion panel embodiments described in U.S. Pat. No. 6,792,964 B2.

Figure 11:
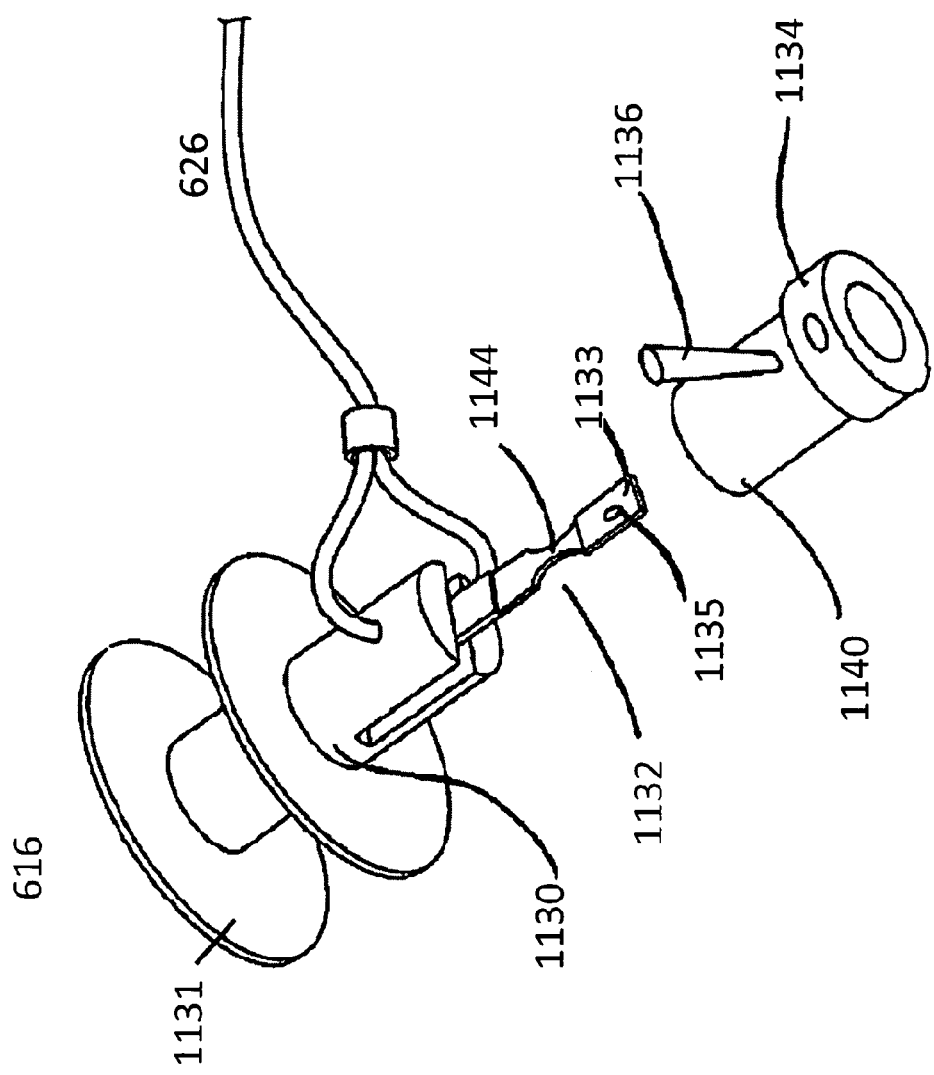
FIG. 11 illustrates an embodiment of a release mechanism that may be used with a butterfly vent.

It is contemplated that any number of release mechanisms may be used with the disclosed butterfly vent. For example, each of a pair of vent panels in a butterfly vent may include a release mechanism such as are illustrated in FIGS. 10 and 11 of the '408 patent. Such an embodiment is illustrated in FIGS. 6D (pre-activation) and 6E (post-activation) of the present disclosure.

One embodiment of a release mechanism 1116 is illustrated in FIG. 11. As illustrated, release mechanism 1116 may pass through an aperture in the panel member (e.g., 611, as illustrated in FIG. 6A), as well as through an aperture in the cross member (e.g., 680, as illustrated in FIG. 6B) to hold a panel member tight against a frame. With reference to FIG. 11, in one embodiment, the release mechanism 1116 comprises a shaft 1130 having a first end terminating in a flanged head 1131 and a second end terminating in a connector 1133 having an aperture 1135 therethrough. A failure member 1132 is located between connector 1133 and the flanged head 1131. The release mechanism 1116 also may include a collar 1134 and pin 1136. The failure member 1132 may include a weakened section 1144, whereby the failure member 1132 is configured to break upon the application of a predetermined tensile force on the failure member 1132. In one embodiment, the failure member 1132 may take the form of a flat plate, and the weakened section 1144 may comprise a portion of the flat plate having reduced thickness or width. The failure member 1132 may be designed to control the pressure differential at which a panel member will open.

Although FIG. 11 illustrates on embodiment of a release mechanism, any suitable release mechanism may be used, including the release mechanisms illustrated in FIGS. 10 and 11 of the '408 patent.

Although the disclosed butterfly vents are generally disclosed as rectangular in shape, it is contemplated that any number of vent shapes may be used. For example, a butterfly vent may include a pair of circular or semi-circular blowout panels, as illustrated, for example, in FIGS. 13 and 14.

Figure 13:
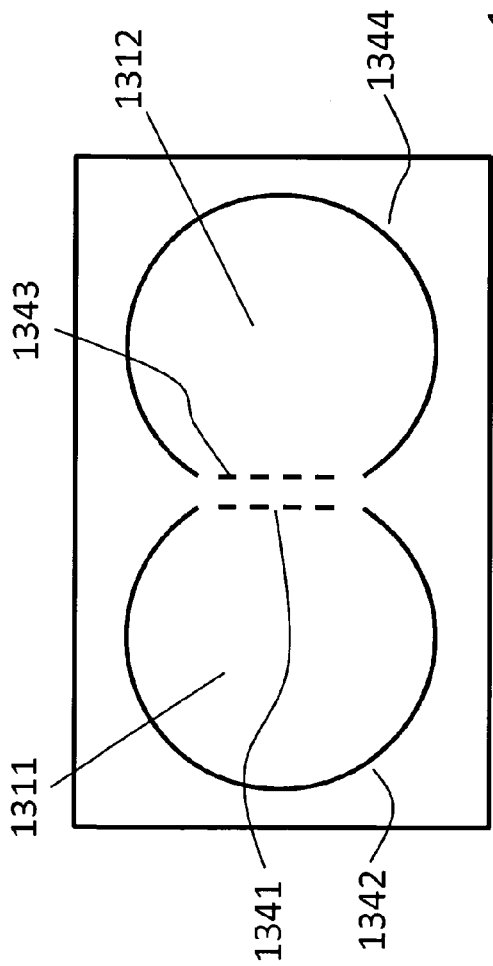
FIG. 13 illustrates an embodiment of a butterfly vent including circular-shaped burst panels.

As illustrated in FIG. 13, circular burst panels 1311 and 1312 may be formed from a single sheet. As shown, burst panel 1311 is partially defined by a line of weakness 1342, which extends around an arc of a circular burst panel profile. A portion of the burst panel profile, indicated by dotted line 1341, may be a line of bending. Similarly in FIG. 13, burst panel 1312 is partially defined by a line of weakness 1344, which extends around an arc of a circular burst panel profile. A portion of the circular burst panel profile, indicated by dotted line 1343, may be a line of bending. A connecting member 1314 is formed between the lines of bending 1341 and 1343. The lines of weakness 1342, 1344 may be formed, for example, through cutting, partially cutting, indenting, stamping, or perforating the sheet material comprising the burst panels. The lines of bending 1341, 1343 may be weakened or unweakened. In one embodiment, a hinge element may be provided with a line of bending. In response to an explosive event within an enclosure (not illustrated), burst panels 1311 and 1312 may tear open along cut or etched perimeters 1342 and 1344, bending toward each other along lines of bending 1341 and 1343 (similarly to the embodiment illustrated in FIG. 1B).

Figure 14:
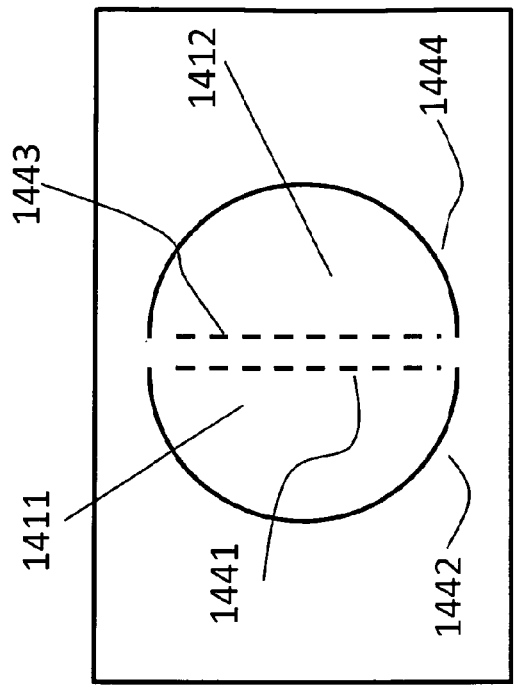
FIG. 14 illustrates an embodiment of a butterfly vent including semi-circular-shaped burst panels.

Also as illustrated in FIG. 14, semi-circular burst panels 1411 and 1412 may be formed from a single sheet. As illustrated, burst panel 1411 is partially defined by a line of weakness 1442, which extends around an arc of a semi-circular burst panel profile. A portion of the burst panel profile, indicated by dotted line 1441, may be an uncut or partially uncut line of bending. Similarly in FIG. 14, burst panel 1412 is partially defined by a cut or etched perimeter 1444, which extends around three sides of a rectangular burst panel profile. A fourth side of the rectangular burst panel profile, indicated by dotted line 1443, may be an uncut or partially uncut line of bending. A connecting member 1414 is formed between the lines of bending 1441 and 1443. The lines of weakness 1442, 1444 may be formed, for example, through cutting, partially cutting, indenting, stamping, or perforating the sheet material comprising the burst panels. The lines of bending 1441, 1443 may be weakened or unweakened. In one embodiment, a hinge element may be provided with a line of bending. In response to an explosive event within an enclosure (not illustrated), burst panels 1411 and 1412 may tear open along cut or etched perimeters 1442 and 1444, bending toward each other along lines of bending 1441 and 1443 (similarly to the embodiment illustrated in FIG. 1B).

In addition to rectangular, circular, and semi-circular burst panels, it is contemplated that a burst panel in a butterfly vent may be any suitable shape. For example, a burst panel may be oval-shaped, triangular-shaped, or irregularly shaped.

The previously discussed embodiments are disclosed as exemplary only and not as limiting the scope of the disclosure to the particular embodiments. Every embodiment disclosed above is not intended to be exclusive or stand alone. For example, it is contemplated that the particular features in any one embodiment can be substituted for, or replaced with, the features of any other embodiment (even though such a particular embodiment may not be explicitly disclosed. In addition, it is contemplated that multiple burst panels may be combined in a single apparatus. For example, a butterfly vent may include multiple pairs of blowout panels mounted in an array.

Other embodiments of the disclosure will be apparent to those skilled in the art from consideration of the specification and practice of the disclosure herein. It is intended that the specification and examples be considered as exemplary only.

What is claimed is:

1. A pressure relief device comprising:
   a first vent, the first vent comprising a first panel;
   a second vent, the second vent comprising a second panel; and
   a connecting member interposed between the first panel and second panel, the first panel and second panel configured to rotate relative to the connecting member; and
   a cord having a first end and a second end, the first end joined to the first panel and the second end joined to the second panel, wherein the cord is configured to join the first panel and second panel in tension;
   wherein the first panel is configured to open upon activation of the first vent;
   wherein the second panel is configured to open upon activation of the second vent; and wherein the first panel and second panel are configured to engage at least their outer ends upon opening.

2. The pressure relief device of claim 1, wherein upon activation of the first vent, the first panel is configured to pull on the cord and thereby trigger activation of the second vent.

3. The pressure relief device of claim 2, wherein the cord causes the first vent and second vent to activate substantially simultaneously.

4. The pressure relief device of claim 1, further comprising:
at least one braking member attached to the cord.

5. The pressure relief device of claim 1, further comprising:
a first activation mechanism configured to control a pressure at which the first vent activates; and
a second activation mechanism configured to control a pressure at which the second vent activates.

6. The pressure relief device of claim 1, further comprising:
a first hinge rotatably joining the first panel to the connecting member; and
a second hinge rotatably joining the second panel to the connecting member.

7. The pressure relief device of claim 6, wherein the first hinge and the second hinge are configured to deform and thereby absorb kinetic energy upon activation of the first vent and second vent.

8. The pressure relief device of claim 1, wherein the first panel is domed and wherein the second panel is domed.

9. A pressure relief device, comprising:
a frame having a central portion, wherein the central portion of the frame defines an eyelet;
a cord having a first end and a second end;
wherein the cord is passed through the eyelet;
a first burst panel mounted within the frame, wherein the first burst panel is configured to rotate relative to the central portion upon opening; and
a second burst panel mounted within the frame, wherein the second burst panel is configured to rotate relative to the central portion upon opening;
wherein the first end of the cord is attached to the first panel; and
wherein the second end of the cord is attached to the second panel;
wherein the first burst panel and second burst panel are configured to activate and open upon experiencing a predetermined pressure differential; and
wherein at least a portion of the first burst panel engages with at least a portion of the second burst panel upon activation.

10. The pressure relief device of claim 9, wherein the cord is configured to ensure that the first burst panel and second burst panel activate at substantially the same time.

11. The pressure relief device of claim 9, further comprising:
a first hinge, wherein the first hinge joins the first burst panel to the central portion of the frame; and
a second hinge, wherein the second hinge joins the second burst panel to the central portion of the frame.

12. A pressure relief device, comprising:
a sheet;
wherein the sheet includes a first line of weakness defining a first burst panel, a second line of weakness defining a second burst panel, and a central portion between the first burst panel and the second burst panel;
a cord joining the first burst panel to the second burst panel;
wherein the first burst panel is configured to activate and rotate relative to the central portion upon experiencing a predetermined pressure differential, wherein rotation of the first burst panel creates a first opening in the sheet;
wherein the cord is configured to transmit a tensile force between the first burst panel and second burst panel upon activation of the first burst panel;
wherein the second burst panel is configured to activate and rotate relative to the central portion upon experiencing a predetermined pressure differential, wherein rotation of the second burst panel creates a second opening in the sheet; and
wherein at least a portion of the first burst panel is configured to contact at least a portion of the second burst panel upon activation of the first burst panel and second burst panel.

13. The pressure relief device of claim 12:
wherein the first burst panel has four sides, wherein the first line of weakness is a cut defining three sides of the first burst panel, and wherein the fourth side of the first burst panel is a first line of bending joining the first burst panel to the central portion; and
wherein the second burst panel has four sides, wherein the second line of weakness is a cut defining three sides of the second burst panel, and wherein the fourth side of the second burst panel is a second line of bending joining the second burst panel to the central portion.

14. The pressure relief device of claim 13, wherein the first line of bending is defined by a partial cut, and wherein the second line of bending is defined by a partial cut.

15. The pressure relief device of claim 12:
wherein the first line of weakness is an arc-shaped cut, and wherein a first line of bending joins the first burst panel to the central portion; and
wherein the second line of weakness is an arc-shaped cut, and wherein a second line of bending joins the second burst panel to the central portion.

16. The pressure relief device of claim 12, further comprising:
a first hinge member engaged between the first burst panel and the central portion; and
a second hinge member engaged between the second burst panel and the central portion.

* * * * *